(12) United States Patent
de Bruijn et al.

(10) Patent No.: US 6,676,832 B2
(45) Date of Patent: Jan. 13, 2004

(54) SURFACE WATER PURIFYING CATCH BASIN

(75) Inventors: Hans de Bruijn, Lancaster, PA (US); Dennis C. Kohl, Mohnton, PA (US); David Schollenberger, Wernersville, PA (US)

(73) Assignee: Terre Hill Silo Company, Terre Hill, PA (US)

( * ) Notice: Subject to any disclaimer, the term of this patent is extended or adjusted under 35 U.S.C. 154(b) by 49 days.

(21) Appl. No.: 10/039,067

(22) Filed: Jan. 5, 2002

(65) Prior Publication Data

US 2003/0127379 A1 Jul. 10, 2003

(51) Int. Cl.$^7$ ................................. B01D 21/02
(52) U.S. Cl. ....................... 210/163; 210/170; 210/521; 210/532.1; 210/538; 404/4
(58) Field of Search ................. 210/163, 170, 210/521, 522, 532.1, 538, 540; 404/4, 5

(56) References Cited

U.S. PATENT DOCUMENTS

| | | | | |
|---|---|---|---|---|
| 3,529,728 A | * | 9/1970 | Middelbeek et al. | 210/522 |
| 3,706,384 A | | 12/1972 | Weijman-Hane | 210/519 |
| 4,123,365 A | * | 10/1978 | Middelbeek | 210/521 |
| 4,132,651 A | * | 1/1979 | deJong | 210/522 |
| RE30,793 E | | 11/1981 | Dunkers | 210/522 |
| 5,397,472 A | * | 3/1995 | Bouchard | 210/521 |
| 5,498,331 A | * | 3/1996 | Monteith | 210/170 |
| 5,605,636 A | * | 2/1997 | Wyness | 210/521 |
| 5,746,911 A | * | 5/1998 | Pank | 210/170 |
| 5,746,912 A | * | 5/1998 | Monteith | 210/170 |
| 5,804,081 A | | 9/1998 | DeGesero et al. | 210/741 |
| 6,077,448 A | * | 6/2000 | Tran-Quoc-Nam et al. | 210/532.1 |
| 6,190,545 B1 | * | 2/2001 | Williamson | 210/521 |
| 6,315,897 B1 | * | 11/2001 | Maxwell | 210/170 |

\* cited by examiner

Primary Examiner—Christopher Upton
(74) Attorney, Agent, or Firm—Martin Fruitman

(57) ABSTRACT

The apparatus is a surface water purifying catch basin which uses a lamella separator to separate out fine sediment and a separate chamber to trap heavy debris, oil, and floating debris. The surface water enters an inlet chamber which is separated from a settling chamber by a divider wall that has a lower opening between the chambers and a higher overflow. The inlet chamber traps floating contaminates and those that are heavier than the water. The opening between the chambers permits the surface water to flow into and through the lamella separator. The catch basin exit is from the settling chamber, but the water can reach the exit only through the lamella separator that separates out the fine sediment in the water. All of the accumulated contaminates can be removed through access holes in the top of the catch basin.

5 Claims, 3 Drawing Sheets

SURFACE WATER PURIFYING CATCH BASIN

BACKGROUND OF THE INVENTION

This invention deals generally with surface water purification, and more specifically with a catch basin which purifies surface water that flows through it.

As more land is being converted to commercial use, contamination of surface water is becoming more of a problem. Not only does the typical parking lot or street affect the natural flow of surface water, but it also significantly contaminates it. When walking through a typical parking lot or along a street it becomes apparent that such surfaces not only accumulate trash, but they also have numerous spills of oil and other fluids from automobiles and trucks. Furthermore, such contamination is not limited to parking lots used for commercial purposes. Parking lots for churches, schools and office buildings have the same problems.

Although it is well understood that all such construction must control its surface water runoff quantity, it is not fully appreciated that the poor quality of surface water coming off a typical parking lot can contaminate streams, estuaries, bays, and ground water supplies if the runoff from the vehicle parking lot is permitted to simply flow onto and sink into the ground.

Considerably more attention and regulation has been devoted to the purification of sewage water, referred to as point source pollution, than to the purification of surface runoff from parking lots and other impervious surfaces. However, the EPA has an effort underway for preventing and regulating such non-point source pollution sources.

It would be very beneficial to have a device which requires no outside power to purify parking lot and street runoff before it is added to streams and the groundwater supply.

SUMMARY OF THE INVENTION

The present invention is a self contained surface water purification unit which requires no outside power because the surface water flows through it under its own gravity induced power. The entire unit is built into a conventional appearing catch basin, usually a concrete vault in the shape of a rectangular prism. The catch basin is built with essentially two chambers, each serving a particular function.

The first chamber is the inlet chamber, and surface water enters into it high on an outside wall. The exit from the inlet chamber is located above the bottom, typically about one third of the way up a wall which separates the inlet chamber from the second chamber, the settling chamber.

The inlet chamber serves as both a floatation chamber and a settling basin. Contaminants which are heavier than water, including stones, metal, and gravel, sink to the bottom of the inlet chamber, while oil and other floating debris float to the top of the water, well above the sediment that has settled to the bottom.

When the water level in the inlet chamber reaches above the exit of the inlet chamber which is located high enough above the bottom of the inlet chamber to permit a significant volume for accumulation of the large debris, the water begins flowing into the second chamber, the settling chamber. The exit of the inlet chamber is located where it will usually be between the floating debris and heavier debris in the bottom of the inlet chamber, thus taking advantage of the natural tendency to separate solids and liquids by density.

The settling chamber contains a lamella separator. Such lamella separators are constructed of multiple parallel plates oriented at an angle to the vertical, and they function to settle fine sediment out of liquid moving up through the separator. The lamella separator is positioned to occupy about one-half the volume of the upper portion of the settling chamber. Surface water entering the settling chamber from the inlet chamber flows directly into the lamella separator, and as the water rises in the settling chamber, since the part of the settling chamber other than the portion holding the lamella separator is closed off by a partition, the water must go through the separator to leave the catch basin. Water going into the separator enters low at one side near the edges of the parallel plates, and the water leaving the separator exits high on the opposite side near the other edges of the plates.

As the surface water rises through the lamella separator, the fine sediment settles out and falls through the spacing between the plates at the bottom of the separator to the bottom of the settling chamber where it accumulates. The outlet for the entire catch basin is located in the upper portion of the settling chamber so that the water goes through the lamella separator before reaching the exit of the catch basin.

One structural feature in the catch basin operates as an emergency overflow. An overflow partition within the inlet chamber, parallel to and spaced from the wall dividing the two chambers forms a third partial chamber. The overflow partition extends down from the top of the inlet chamber to close to the exit of the inlet chamber. However, the divider wall between the chambers does not actually reach the top of the catch basin. Thus, if the inlet chamber becomes full, the water spills over the divider wall and directly into the top portion of the settling chamber, and the excess water leaves the catch basin without going through the lamella separator, but can not pick up the material previously settled out. The location of the overflow partition close to the divider wall also prevents most of the floating debris in the inlet chamber from overflowing into the settling chamber, because only that small amount of the floating debris between the divider wall and the overflow partition has access to the overflow above the divider wall.

Nevertheless, to aid in the removal of the oil in any overflow, and also in the normal flow, an oil capturing "blanket" can also be located within the portion of the settling chamber from which the liquid exits the catch basin. This blanket is a layer made of a hydrophobic, oil absorbing material, and the liquid flows over it before exiting.

The only maintenance required for the catch basin of the invention is the cleaning out of the two chambers and the occasional replacement of the oil capturing blanket when it is used. Access holes are provided for this in the top of each chamber. Access to the floating material and the large debris in the inlet chamber is straightforward since a pipe lowered through the access hole in the top can easily reach the floating material and the debris settled to the bottom. However, in the settling chamber an access door is provided in the partition between the upper and lower portions. When the access door is opened, a pipe can be lowered all the way to the bottom to pump out the fine sediment. The oil capturing blanket is also accessible through the access hole above the settling chamber.

The catch basin of the invention thereby furnishes a device to remove trash, oil, and both large and fine sediment, and the only maintenance it requires is the occasional removal of the accumulated contaminants. Furthermore, the lamella separator of the invention reduces the horizontal area used for settling to 12 to 25 percent of the area used by previously available simple gravity or single angular plate separators.

DETAILED DESCRIPTION OF THE INVENTION

Figure 1:
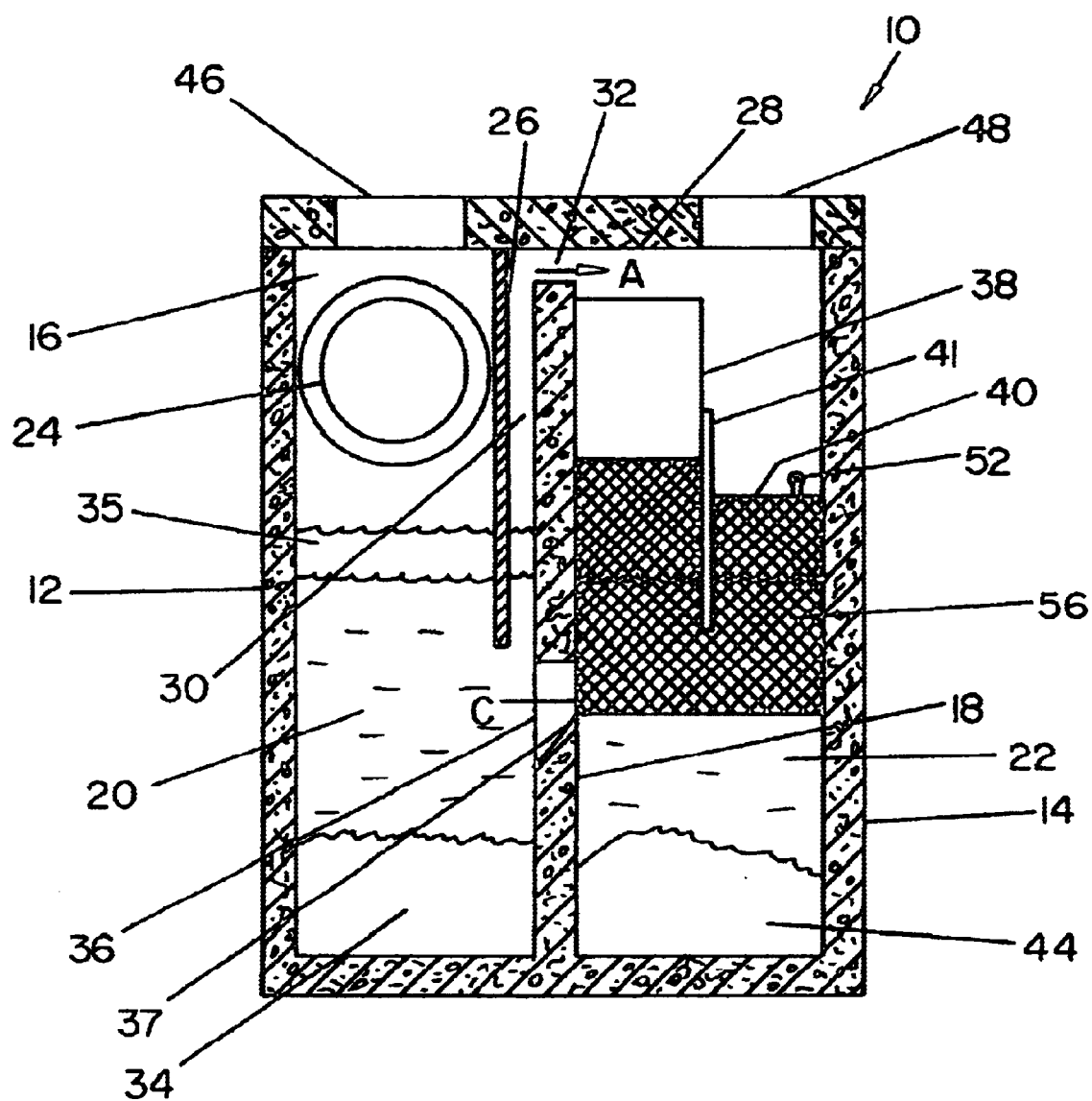
FIG. 1 is a cross section view of the preferred embodiment of the catch basin of the invention from a side of the catch basin oriented transverse to the divider wall between the inlet and the settling chambers.

FIG. 1 is a cross section view of the preferred embodiment of the catch basin of the invention from a side of the catch basin oriented transverse to divider wall 18 between inlet chamber 20 and settling chamber 22. For the preferred embodiment, catch basin 10 of the invention is essentially an enclosure shaped as a rectangular prism. Thus, walls 12 and 14 are on opposite sides of the enclosure, the near wall is removed for viewing the interior structure, and another wall 16 closes off the far side of the enclosure.

Inlet chamber 20 is essentially an empty volume into which inlet pipe 24 empties. Inlet pipe 24 is located near the top of inlet chamber 20. The one structural feature within inlet chamber 20 is overflow partition 26. Overflow partition 26 is simply a wall attached to and extending down from top wall 28 of catch basin 10 to the region near opening 36 in divider wall 18. Overflow partition 26 is parallel to divider wall 18 and spaced from it sufficiently so that liquid rising in inlet chamber 20 will also rise within space 30 between overflow partition 26 and divider wall 18.

Figure 2:
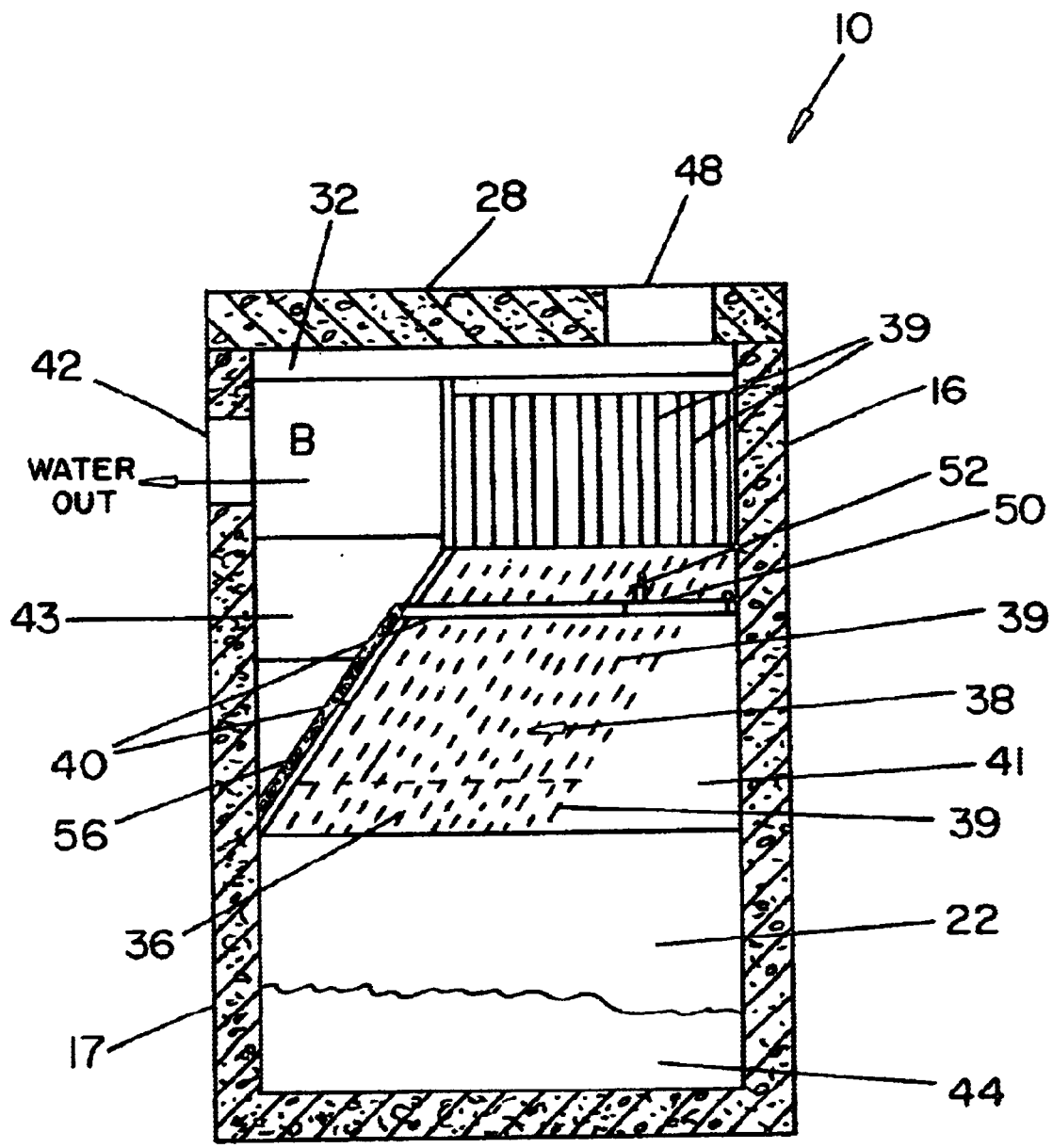
FIG. 2 is a cross section view of the preferred embodiment of the catch basin of the invention from a side of the settling chamber which is at 90 degrees to the view of FIG. 1.
Figure 3:
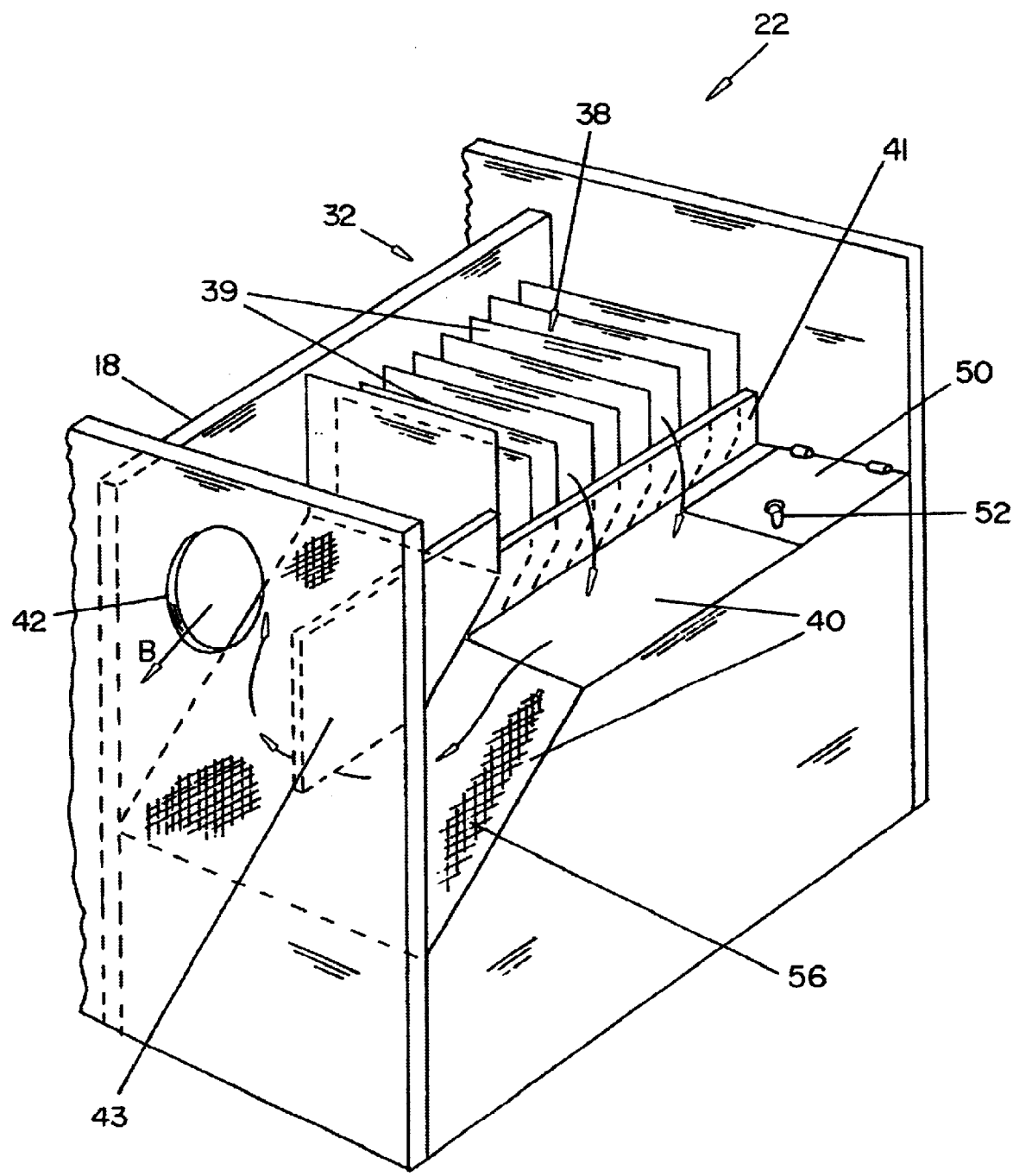
FIG. 3 is a perspective view of the settling chamber of the invention showing the flow path from the lamella separator to the catch basin exit.

Divider wall 18 actually does not meet top wall 28 so that a space remains between them to form overflow 32. Thus, if, the water in inlet chamber 20 rises to the height of overflow 32 because, during an unusual event, there is excessive flow into catch basin 10, the water spills over divider wall 18 into the top of settling chamber 22 as shown by arrow A in FIG. 1, and out through exit 42 of settling chamber 22, as shown in FIGS. 2 and 3 by arrow B. However, overflow partition 26 prevents most of the debris and the liquids floating on top of the water from being discharged from catch basin 10.

Inlet chamber 20 functions as both a settling basin and a flotation chamber. Heavy contaminants such as metal, stone, and gravel settle to the bottom of inlet chamber 20, accumulate as large debris 34, and do not continue with the flow of the water. Furthermore, floating debris and liquids lighter than water, shown in FIG. 1 as scum 35, float to the top of the liquid in inlet chamber 20.

Water normally leaves inlet chamber 20 and moves into settling chamber 22 through opening 36 in divider wall 18. Opening 36 is located far enough up divider wall 18 to define a volume at the bottom of inlet chamber 20 to hold the anticipated quantity of large debris 34 and to allow only water to enter opening 36, so that no material is picked up from large debris 34 accumulated at the bottom of inlet chamber 20. The slope of the bottom 37 of opening 36 prevents the accumulation of any sediment on bottom 37 of opening 36, and the edges of parallel lamella plates 39 (FIG. 2) of lamella separator 38, which are mounted tightly against opening 36, function as a bar screen to also block the entry of large debris into settling chamber 22.

The water flow moving through opening 36 has no significant velocity since it is driven through opening 36 by only the slight pressure head of the water above opening 36 within inlet chamber 20. In the preferred embodiment of the invention, catch basin 10 has a total height of about 10 feet, and since the exit from settling chamber 22 is located about a third of the way from the top of catch basin 10 while opening 36 is located about a third of the distance from the bottom, the head of pressure moving water through opening 36 is only about 3 feet at most. The resulting low velocity permits the heavier contaminants to easily sink to the bottom of inlet chamber 20.

As seen in both FIG. 1 and FIG. 2, as water, indicated by arrow C, flows through opening 36 into settling chamber 22, and after it fills the lower portion of settling chamber 22, it rises within lamella separator 38. Partition 40 and vertical partition 41 are located within settling chamber 22 between opening 36 and water exit 42 to prevent the water from rising into exit 42 without first moving upward through lamella separator 38.

As shown in FIG. 2 and well known in the literature, lamella separator 38 is constructed as a configuration of solid parallel plates 39 oriented at an angle to the vertical with a small spacing between the plates. Vertical partition 41, through which parallel lamella plates 39 are shown by dashed lines, closes off one side of lamella separator 38 and divider wall 18 closes off the other side so that the water must travel from the bottom to the top within lamella separator 38. Lamella separator 38 acts, as do other lamella separators, to cause fine sediment 44, such as fine sand suspended in the surface water, to settle out and fall into the volume below the separator.

FIG. 3 is a perspective view of settling chamber 22 of the invention, with the top wall and the near side vertical wall removed, showing the flow path from lamella separator 38 to catch basin exit 42. As best shown in FIG. 3 by the flow indicating arrows, as the water rises through lamella separator 38, it moves above partition 40 and over the top edge of vertical partition 41. It then leaves lamella separator 38, flows across partition 40, below extension 43 of vertical partition 41, and out of catch basin 10 through exit 42. Oil capturing blanket 56 can easily be mounted on the sloped portion of partition 40, where the water normally flows under below extension 43. When oil capturing blanket 56 is included in settling chamber 22, it furnishes and additional opportunity to remove oil remaining in the water exiting catch basin 10.

Thus, as the surface water moves through catch basin 10 of the invention, three major contaminants are removed and separated. Heavy material accumulates in the bottom of inlet chamber 20. Floating debris and liquids that are lighter than water accumulate on top of the water in inlet chamber 20, and fine sediment accumulates in the bottom of settling chamber 22. Oil capturing blanket 56 offers the further opportunity to remove remnants of any oil remaining in the water.

The only regular maintenance required when using the invention is the removal of the accumulated contaminants from catch basin 10 and the occasional replacement of the oil capturing blanket. The removal of the contaminants is accomplished quite simply by the use of a conventional pump normally used to clean out such locations as street drains. The end of the pickup hose of such a pump is first lowered into inlet chamber 20 through cleanout hole 46, lowered to the level of floating scum 35, and scum 35 is pumped out. The end of the pickup hose is then lowered fully to the bottom of inlet chamber 20 and large debris 34 is pumped out. Finally, the end of the pickup hose is lowered through cleanout hole 48 into the bottom of settling chamber 22, and fine sediment 44 is pumped out. In order to permit the pickup hose to reach the bottom of settling chamber 22, hinged door 50 in partition 40 is first manually opened by reaching through access hole 48 with a tool to engage handle 52 on door 50. Cleanout hole 48 also provides access for the occasional removal of oil capturing blanket 56.

The present invention thereby furnishes a simply constructed surface water purifying catch basin which requires no outside power and only routine maintenance. Moreover, the lamella separator of the invention reduces the horizontal area used for settling to 12 to 25 percent of the area used by previously available simple gravity or single angular plate separators.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, cleanout holes 46 and 48 can be furnished with simple covers or can have attached cylindrical extensions which rise to ground level above top 28 of catch basin 10, and they can be made large enough for personnel to pass through them. Furthermore, inlet 24 and exit 42 can also be located on different walls of catch basin 10.

What is claimed as new and for which Letters Patent of the United States are desired to be secured is:

1. A water purifying catch basin comprising:
    an enclosure with a bottom and a top wall and with the enclosure separated into an inlet chamber and a settling chamber by a divider wall;
    a water inlet permitting water to flow into the inlet chamber from outside the catch basin;
    a water exit permitting water to flow out of the catch basin from the settling chamber, with the water exit located no higher above the bottom of the catch basin than the water inlet;
    a lamella separator located within the settling chamber so that there is a volume below the lowest part of the lamella separator for accumulating sediment removed from the water by the action of the lamella separator;
    a first opening in the divider wall to permit water to move from the inlet chamber to the lamella separator, with the opening located high enough in the divider wall to create a volume within the inlet chamber below the first opening in the divider wall for collecting material that is heavier than water which settles out of the water in the inlet chamber;
    a second opening in the divider wall above the first opening in the divider wall forming an overflow permitting liquid to flow from the inlet chamber into the settling chamber if the water in the inlet chamber reaches the height of the overflow; and
    a partition in the settling chamber with the partition located between the first opening in the divider wall and the water exit and configured to prevent water from moving from the first opening in the divider wall to the water exit without passing through the lamella separator.

2. The catch basin of claim 1 further including at least two access holes in the top wall of the catch basin, the access holes located to permit cleaning out the accumulated material in both the inlet chamber and the settling chamber.

3. The catch basin of claim 1 further including a door within the partition in the settling chamber to permit access to the volume below the partition for clean out of the accumulated material in the settling chamber.

4. The catch basin of claim 1 further including an overflow partition comprising a wall in the inlet chamber with the overflow partition extending from the top wall of the catch basin to below the second opening in the divider wall, with the overflow partition located adjacent to the divider wall but spaced far enough from the divider wall to permit water to rise between them.

5. The catch basin of claim 1 further including an oil capturing blanket located in the settling chamber and positioned so that liquid leaving the lamella separator flows over the oil capturing blanket before exiting the catch basin.

* * * * *